(Model.)
J. & M. N. ANDERSON.
LACING OR WHANG NEEDLE.
No. 245,928. Patented Aug. 23, 1881.
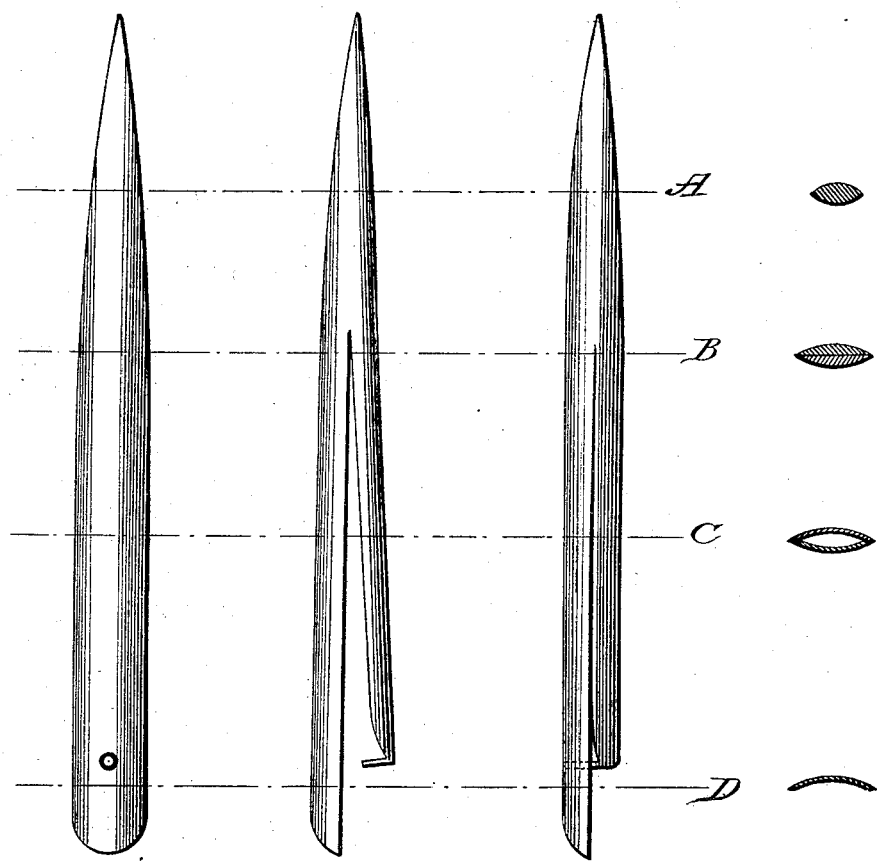
Witnesses:
J. H. Peck
John T. Bird
Inventor:
John Anderson
M. N. Anderson
per F. J. Harper atty

United States Patent Office.

JOHN ANDERSON AND MARTIN N. ANDERSON, OF ROSEVILLE, ILLINOIS.

LACING OR WHANG NEEDLE.

SPECIFICATION forming part of Letters Patent No. 245,928, dated August 23, 1881.

Application filed January 24, 1881. (Model.)

*To all whom it may concern:*

Be it known that we, JOHN ANDERSON and MARTIN N. ANDERSON, citizens of the United States, residing at Roseville, in the county of Warren and State of Illinois, have invented a new and useful Lace or Whang Horse-Collar and Belt Sewing Needle, of which the following is a specification.

This needle is invented for the purpose of manufacturing horse-collars, sewing belts, &c.

Figure 1 represents the lace or whang needle on the side, exposing the hole that serves as a catch for the teat that holds the whang in the needle. Fig. 2 presents an edgewise view of the needle, showing the division opened as it would be in case the operator were inserting the whang, also the teat that passes through the whang. The dotted lines across the long section represent the course of the teat through the hole in the long section. Fig. 3 also represents the needle viewed edgewise with section closed, as it is when the needle is used.

Section A represents the needle at the parts indicated by the dotted lines as being solid.

Section B, as indicated by the dotted lines, shows the needle at the commencement of the division.

Section C represents the concaved inside of the needle as it shows when the needle is closed.

Section D represents the end of the long section passing beyond the end of the shorter section.

Our invention or discovery is made after, in some slight respects, the manner of an ordinary needle. It is made of steel and is solid for about one-half its length; then from that to the end it is divided, forming two independent parts. This forms a sort of spring-clamp. On the inside of these divided pieces they are hollowed out or concaved, which is to prevent the end of the whang from working out sidewise. On the end of one of these divided pieces is a teat or catch, the point of which is needle-pointed and stands slanting forward just a trifle. This teat is pressed through the whang, and thus holds it in the needle, while the concave on the inside prevents the end of the whang from working out and interfering with using it.

The only thing, to our knowledge, now in existence used for the purposes that this lace or whang needle is being made, is what is called the "drawing-awl," and this drawing-awl is in no way similar to our needle, neither in the manner in which it is used nor in its construction.

By the use of this lacing-needle the user is enabled in all work, and especially in the manufacturing of horse-collars, to work much more rapidly, and his work will be much better done than is possible to do when the drawing-awl is used, for the reason that in using the drawing-awl the hole made to draw the whang through must of a necessity be twice as large as when the needle is used, because with the awl the whang must be put through double, and when this is drawn out it leaves the hole but half filled, while with the needle the whang may be larger than the hole, and when drawn in makes a solid, compact job.

What we claim, and desire to secure by Letters Patent of the United States, is—

A lacing or whang needle solid from the point to near the center, thence hollowed to the end, and longitudinally divided in two parts, one of which is provided with a teat at, or nearly at, right angles thereto, which engages in a hole located in the other part.

JOHN ANDERSON.
MARTIN N. ANDERSON.

Witnesses:
J. W. PECK,
BENJAMIN RUSHER.